United States Patent
Leitzke et al.

[11] Patent Number: 6,135,693
[45] Date of Patent: Oct. 24, 2000

[54] BOW TIE LOCKING COTTER

[75] Inventors: Rue S. Leitzke, Hustisford; Roman J. Baus, Rubicon, both of Wis.

[73] Assignee: Pivot Point, Inc., Hustisford, Wis.

[21] Appl. No.: 09/274,836

[22] Filed: Mar. 23, 1999

[51] Int. Cl.[7] ........................................ F16B 21/14
[52] U.S. Cl. ........................ 411/530; 411/315; 411/514
[58] Field of Search ..................... 411/351, 530, 411/513, 514, 515, 210, 218

[56] References Cited

U.S. PATENT DOCUMENTS

| | | | |
|---|---|---|---|
| 40,714 | 11/1863 | St. John | 411/530 |
| 270,410 | 1/1883 | Fox . | |
| 1,171,536 | 2/1916 | Ostrander . | |
| 1,171,740 | 2/1916 | Martus . | |
| 1,300,609 | 4/1919 | Heinkel . | |
| 1,403,090 | 1/1922 | Merrick . | |
| 1,532,148 | 4/1925 | Malone . | |
| 1,593,433 | 7/1926 | Carlson . | |
| 1,768,720 | 7/1930 | Taylor . | |
| 1,799,934 | 4/1931 | Strid | 411/530 |
| 1,913,555 | 6/1933 | Lyle . | |
| 2,266,689 | 12/1941 | Lemison . | |
| 2,926,033 | 2/1960 | Zarrillo | 411/530 |
| 3,255,654 | 6/1966 | Bleicher . | |
| 4,298,299 | 11/1981 | Quarles . | |
| 4,592,689 | 6/1986 | Leitzke . | |
| 5,217,338 | 6/1993 | Czubek . | |
| 5,324,152 | 6/1994 | Anderson, IV . | |
| 5,599,150 | 2/1997 | Edwards et al. . | |
| 5,662,446 | 9/1997 | Haan . | |

FOREIGN PATENT DOCUMENTS

| | | | |
|---|---|---|---|
| 1369526 | of 1964 | France . | |
| 678356 | 12/1964 | Italy | 411/515 |

*Primary Examiner*—Flemming Saether
*Attorney, Agent, or Firm*—Ryan Kromholz & Manion, S.C.

[57] ABSTRACT

A cotter formed from a single piece of wire including a free end, first and second gripping portions, a helical section and a locking leg. The cotter may be installed on a pin having an opening by grasping either, oppositely disposed gripping portion. The arrangement of the locking leg and a helical section formed therein allows for easy installation but requires a compound motion for removal of the cotter.

15 Claims, 3 Drawing Sheets

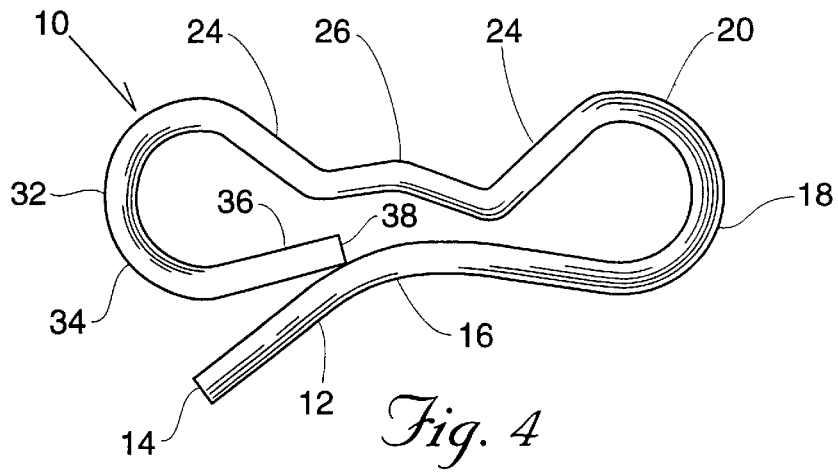
Fig. 4
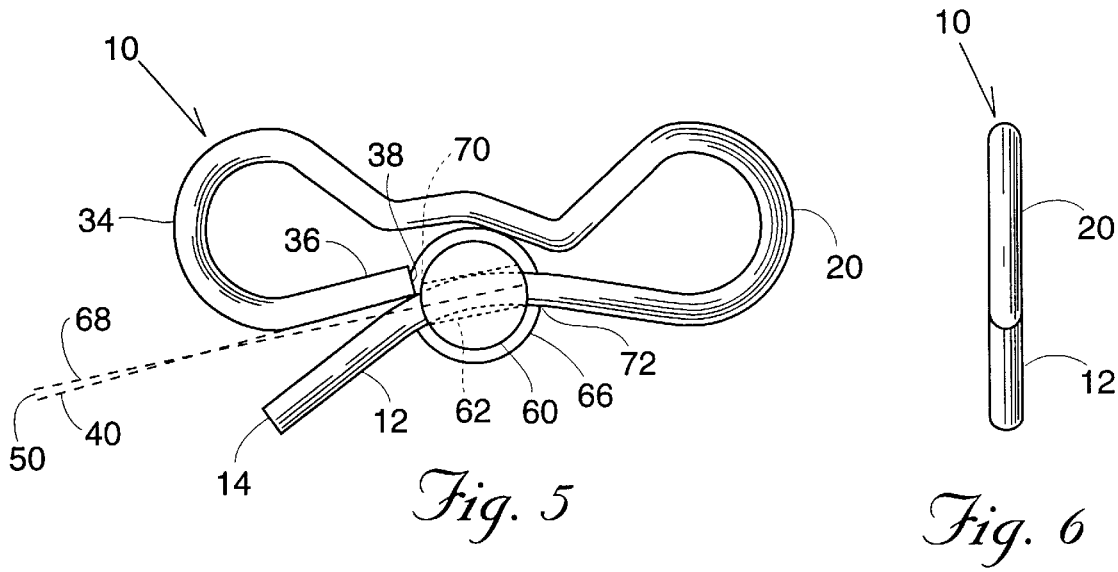
Fig. 5
Fig. 6
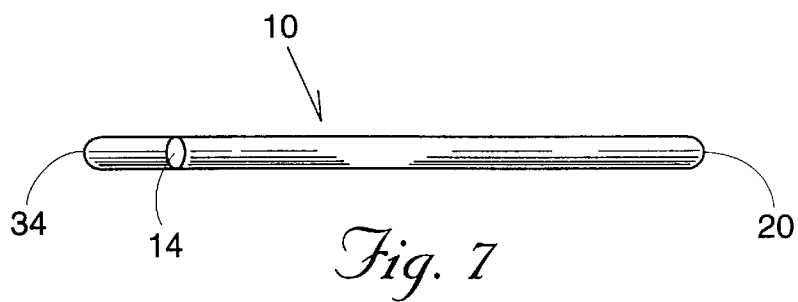
Fig. 7

BOW TIE LOCKING COTTER

BACKGROUND OF THE INVENTION

Many cotters, cotter pins and cotter keys are known in the art. However, none of the prior art designs are known to have the structure and features of the present invention. The function of a cotter is to provide a means for locking a pin, post or stud in an opening. Common applications of the cotter can be found in the agricultural and construction industries. A cotter is often utilized to retain a pin within openings formed in to or more machine parts. For example, a disc may be attached to a tractor with a three-point hitch. At each hitching point a pin passes through openings in the hitch and disc frame. Each pins is retained in its respective opening with a cotter.

To make a cotter a more effective tool for retaining pins, posts or studs in openings, the cotter should have the capability to be easily connected and disconnected from its mating pin, post or stud. In addition, it is highly desirable that the cotter maintains its installed position despite the operating environment of the equipment to which it is attached.

One of the drawbacks of known cotters, such as the traditional spring clip cotter, is that prior art cotters can only be grasped on one side for attachment or removal. In other words, the prior art cotter has only one gripping portion. The spring clip cotter also lacks a positive locking mechanism for more securely attaching the cotter to the pin, post or stud. In an environment where the cotter is exposed to excessive shock, vibration and stress, the cotter may come free from the pin, post or stud.

Improvements to the cotter have been disclosed in previous patents. See for example, U.S. Pat. No. 4,592,689 entitled Ring Spring Cotter issued on Jun. 3, 1986 and assigned to the same assignee as the present invention. The Ring Spring Cotter design discloses a pin in the form of a "figure 8". A locking mechanism is provided where the end of the pin is bent to lock the pin in its closed position. Other typical examples of prior art cotters are described in U.S. Pat. No. 5,662,446, entitled Easy Lock Safety Spring Cotter Pin issued to Louis R. Han on Sep. 2, 1997; U.S. Pat. No. 5,217,338, entitled Twist Type Locking Pin issued to Richard S. Czubek on Jun. 8, 1993; and U.S. Pat. No. 4,298,299, entitled Hairpin Cotter Key issued to James R. Quarles on Nov. 3, 1981. Each of these prior art devices requires an additional "locking step" to positively lock the cotter onto the pin, post or stud after installation.

This invention relates to a unique and novel cotter pin design that is easy to install, easy to remove, and provides a locking feature without requiring further or additional steps to lock the pin.

It is an object of the present invention to provide a cotter pin the can be easily installed on a post, shaft, bolt or other device. Another object of the invention is to provide a cotter that is easy to remove from its installation. It is a further object of this invention to provide a cotter that is securely attached to its mating component so that the cotter does come lose as a result of vibration or shock.

SUMMARY OF THE INVENTION

The present invention, a bow tie locking cotter, provides a cotter having oppositely disposed gripping portions to facilitate easy installation and removal of the cotter. In addition, the bow tie cotter includes an integral locking structure whereby simple linear motion is utilized to install the cotter but a compound motion must be imparted on the cotter in order to remove the device from its mating pin, post or stud.

In one configuration, the bow tie locking cotter is formed from a continuous piece of wire-like material having overlapping first and second ends; the wire-like material having first and second oppositely disposed arcuate gripping sections formed between its overlapping ends; and a helical section integrally formed between said arcuate gripping sections. The overlapping first and second ends form a locking structure. The first end may extend a predetermined distance beyond said overlapping ends to facilitate installation of said cotter. A compound motion, such as lifting and pushing on the second arcuate gripping section must be imparted on the cotter for removal from the pin. The wire-like material, which may comprise spring wire or stainless steel, lies in the same plane.

Alternatively, the bow tie locking cotter may be described as having a continuous segment of wire-like stock having a first end and a locking end; a pair of oppositely disposed arcuate gripping portions formed between said first end and locking end; and a helical section formed between said pair of arcuate gripping portions. In this form, the first end and the locking end overlap to form a locking structure. The locking structure provides for facile installation of the cotter but requires a compound motion for removal. Again, the first end may extend a predetermined distance beyond said locking end to facilitate installation of the cotter into the pin hole and the wire-like stock of the entire device lies in the same plane.

In yet another embodiment, the bow-lock hairpin cotter is formed from a single piece of wire-like stock having first and second gripping portions and a free end for attachment through the opening formed in the pin, and includes a first section for being received in the opening, the first section being bent in a gradual reversed arc and adjoining a first end of a first arcuate loop forming the first gripping portion; a second end of the first arcuate loop transgressing adjacent the first section and terminating in a second arcuate loop forming the second gripping portion and terminating at a wire end. In addition, the wire end may be located between said first section and said first end of said second end of the first arcuate loop and the wire end may substantially abut the pin in a locked condition when said pin is received with the pin opening.

In yet another configuration, the bow tie locking cotter is formed from a single piece of wire having a first end, a first arcuate bend, a helical section, a second arcuate bend, and a locking end; the first end is disposed for being received in the pin opening; the helical section is formed between the first and second arcuate bends for partially encapsulating the pin; and the locking end is positioned between the first end and helical section to positively lock the cotter on the pin.

DESCRIPTION OF THE DRAWINGS

FIG. 4 is a top plan view of the bow tie locking cotter.

FIG. 5 is a top plan view of the view shown in FIG. 2.

FIG. 6 is a right side elevational view of the bow tie locking cotter.

FIG. 7 is a front elevation view of the bow tie locking cotter.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
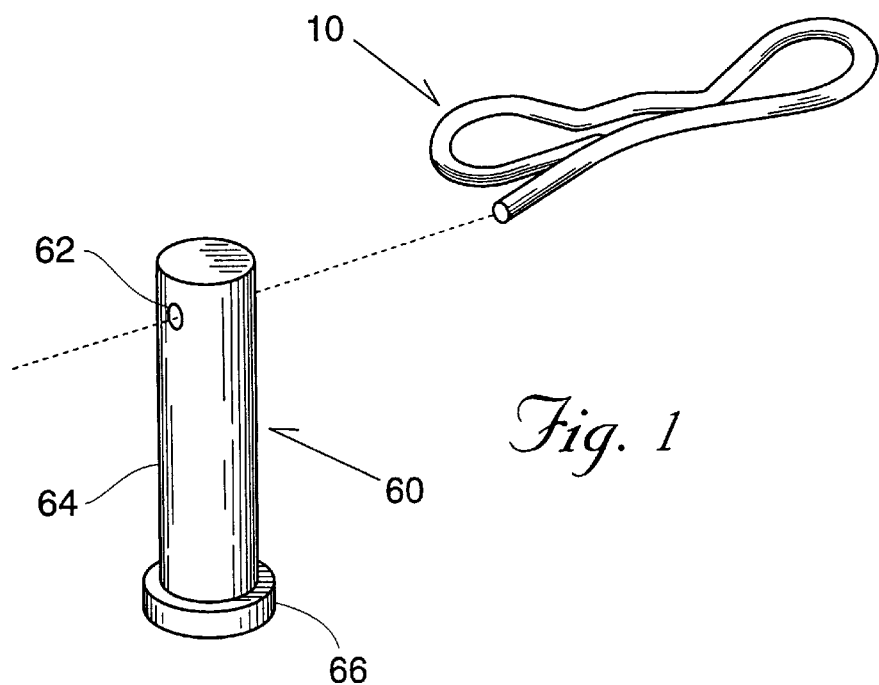
FIG. 1 is a perspective view of a shaft with the bow tie locking cotter at one side ready to install.
Figure 2:
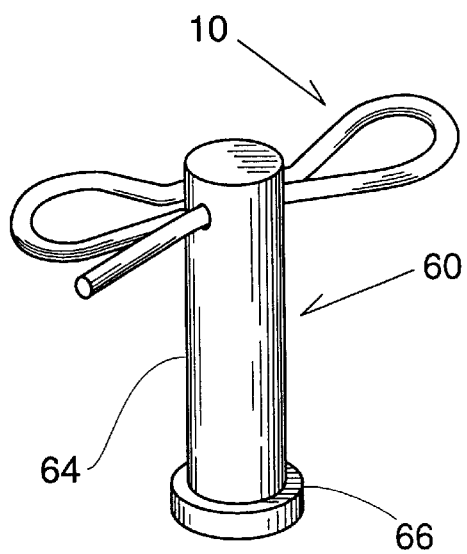
FIG. 2 is a perspective view of a shaft with the bow tie locking cotter installed.
Figure 3:
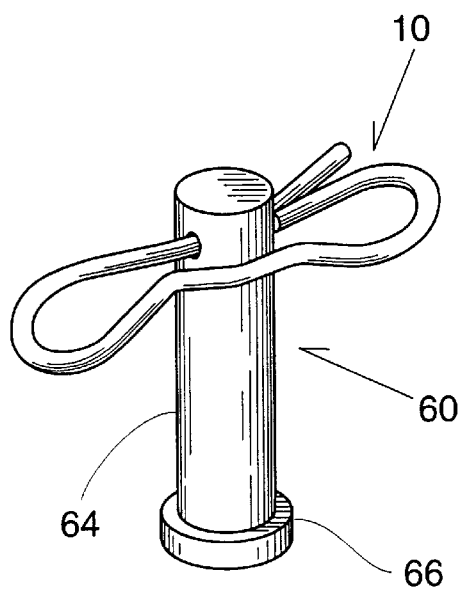
FIG. 3 is a view similar to FIG. 2, but taken from the opposite side.
Figure 8:
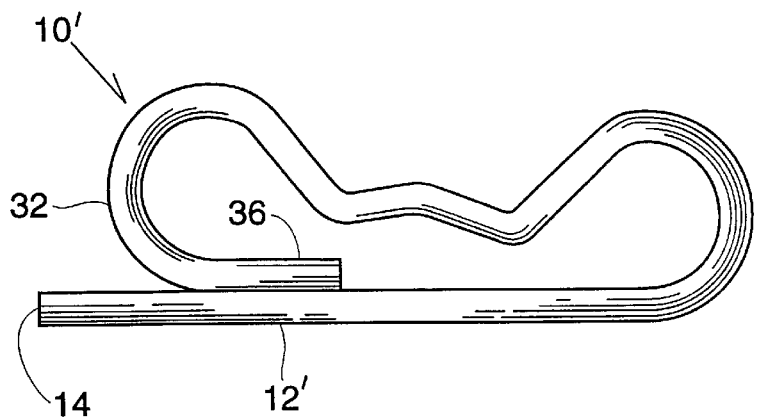
FIG. 8 is a top plan view of an alternative embodiment of the bow tie locking cotter.
Figure 9:
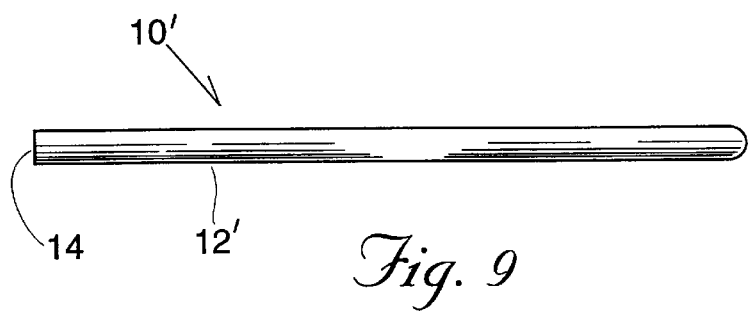
FIG. 9 is a front elevational view of the cotter shown in FIG. 8.
Figure 11:
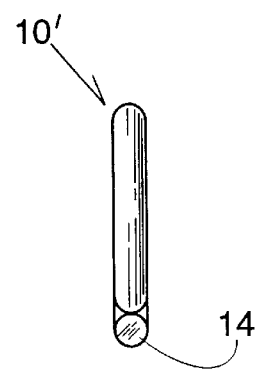
FIG. 11 is a left side elevational view of the cotter shown in FIG. 8.
Figure 10:
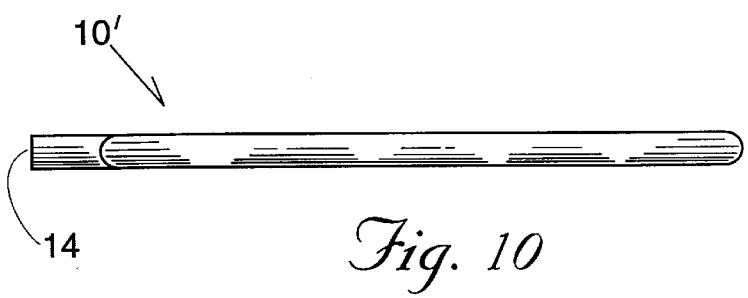
FIG. 10 is a rear elevational view of the cotter shown in FIG. 8.
Figure 12:
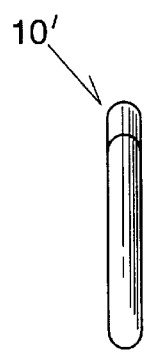
FIG. 12 is a right side elevational view of the cotter shown in FIG. 8.

With reference to the drawings in general, and to FIGS. 1 through 3 in particular, the novel cotter of this invention comprises a wire generally designated as 10 sized to be received in an opening 62 in a pin 60. Referring to FIG. 4, the bow tie locking cotter 10 is comprised of a first section 12 that may be straight or have a tensioning radius or slight curve 16 as best shown in FIGS. 1, 2 and 4. The tensioning radius 16, in part, provides an enhanced locking feature of the cotter 10 when installed on a pin 60. The structure and function of the tensioning radius 16 is discussed in detail below.

First section 12 terminates on one side at free end 14. Free end 14 is disposed to be received in the opening 62 in the pin 60 to which the cotter 10 is to be attached. The non-terminating end of first section 12 leads to a first arcuate or smooth radiused bend 18. Arcuate bend 18 forms the first gripping portion 20 of the bow tie locking cotter 10. First arcuate bend 18 is integral with a helical section 24. It should be noted from FIGS. 1, 3 and 4 that a central region 26 is formed in helical section 24. Central region 26 is nearly adjacent to first section 12.

Helical section 24 connects at its opposite end to a second arcuate or smooth radiused bend 32. Arcuate bend 32 forms the second gripping portion 34 of the bow tie locking cotter 10. The opposite end of the second arcuate bend substantially straightens into a second section or locking leg 36. Second section 36 terminates at a locking end 38.

In its relaxed or unapplied state, locking end 38 is positioned between first section 12 and helical section 24. First section 12, including tensioning radius 16, and locking end 38 may be in contact, or substantial contact, with one another.

The pin 60 is provided with a cotter pin hole 62 through which free end 12 on the bow tie locking cotter is to be inserted. As shown in FIGS. 1 and 2, pin 60 has a shaft 64 and a head 66 at the end opposite hole 62. Other forms of the pin may be used with the present invention 10. The pin 60 and other attachment posts and studs are well known in the art.

In applying the cotter 10 of this invention to pin 60, it should be noted that the user may grip either the first 20 or the second 34 gripping portion to install the cotter. If first gripping portion 20 is selected, free end 14 is aligned with opening 62 and the cotter 10 may be pushed onto the pin 60.

Alternatively, the user may chose to pull cotter 10 onto pin 60 by selecting second gripping portion 34. This is an important aspect of the cotter 10 as some cotter applications have tight space constraints that make the use of traditional cotters sub-optimal.

The cotter 10 is installed as follows. The free end 14 of the cotter 10 is first inserted into the opening 62 in pin 60. As free end 14 is inserted through opening 62, second section 36 comes into contact with the pin shaft 64. Applying an increased pressure on either the first 20 or the second 34 gripping portion causes the first section 12 to be biased away from the second section 36 and the locking end 38. Simultaneously, the second arcuate section 32 compresses while the first arcuate section 18 expands. In turn, locking end 38 and locking leg 36 ride up and over the pin shaft 64. Finally, pin shaft 64 is locked into place as first section 12 and locking end 38 return to substantial contact. The central region 26 of helical section 24 is now positioned over a portion of pin shaft 64.

To ensure that the second section 36, including locking end 38, positively locks cotter 10 to pin 60, the angle formed between the central axis 68 of opening 62 and the longitudinal axis 40 of second section 36 must be greater than zero degrees. This angle, shown at reference numeral 50 in FIG. 5, is commonly referred to as the angle of attack.

Tensioning radius 16 minimizes radial movement as the pin 60 is captured between locking end 38 on one end and the central region 26 of helical section 24 in conjunction with contact of the tensioning radius 16 with the edge 72 of pin opening 62. In addition, tensioning radius 16 maintains the locking leg or second section 36 angle of attack with respect to the pin shaft 64. Cotter 10 cannot be removed from pin 60 by applying a simple linear pulling force to the first gripping portion 20 or by applying a linear pushing force to second gripping portion 34. In either instance, the position of locking end 38 relative to pin shaft 64 prevents removal.

Referring to FIG. 5, tensioning radius 16 maintains the locking leg 36 angle of attack with respect to the pin opening 62 and pin shaft 64. Without the tensioning radius, the locking leg would be positioned parallel to pin opening 62 and may have the tendency to ramp over pin shaft 64 (especially if a substantial linear force is applied to either gripping portion). While this form of the cotter 10 may be suitable for some applications, it does not have the positive locking capabilities of the preferred embodiment.

Tensioning radius 16 also biases the locking leg 36 toward the top part 70 of the pin opening 62 thereby increasing the cotter's resistance to removal. On the opposite side of opening 62, tensioning radius 16 contacts the edge 72 of the pin opening 62. The contact or substantial contact between locking end 38 and pin shaft 64 in conjunction with the contact of tensioning radius 16 at edge 72 minimizes the radial movement of the cotter 10.

To remove cotter 10 from pin 60, a compound motion is required. In a first combination, both a lifting (tangential) and a pushing (radial) force must be applied to second gripping portion 34. The tangential force may be applied first, followed by the radial force, or both forces may be applied simultaneously. Alternatively, a tangential force may be applied to second gripping portion 34 while a radial force is applied to first gripping portion 20. Again, the tangential force may be applied first immediately followed by the radial force or both may be applied at the same time. Upon exerting the tangential force, first arcuate bend 18 must expand or open as the locking leg 36 passes up and over the pin shaft 64. The tensioning radius 16 of first section 12 facilitates the removal of the cotter 10 once locking end 38 passes over pin shaft 64. Absent a compound motion, the cotter 10 cannot be removed. Likewise, it is not possible to simply "knock-off" the cotter 10 either.

The wire of the cotter 10 is preferably dimensioned with regard to its size and formed of a material of such hardness and springiness, so that the operations described may be performed over and over. For example, the bow tie locking cotter may be made of 0.120 hard drawn MB spring wire or 302 stainless steel to fit over a half inch shaft. As shown in FIGS. 6 and 7, it should be further noted that the entire wire form 10 preferably lies in the same plane.

As shown in FIGS. 8 through 11 it is within the province of the invention to provide a bow tie locking cotter 10' in which the first section 12' is substantially straight. The substantially straight first section 12' will be substantially parallel and adjacent to the second section 36. The free end 14 may extend beyond the arc of curvature of the second arcuate bend 32 so that the cotter 10' may be facilely installed on the pin 60 or other device.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A coplanar bow tie locking cotter for a pin comprising:
    a continuous piece of wire stock having overlapping first and second ends;
    said wire stock having first and second similarly configured, oppositely disposed arcuate loops with gripping sections;
    a helical section of said wire stock integrally formed between said arcuate loops;
    a first section being bent in a gradual reversed arc and adjoining said first end and an end of said a first arcuate loop, said first arcuate loop forming the first arcuate gripping section;
    said second end extending in a direction of said first arcuate loop and being located between said first end and said helical section adjacent said first section.

2. The device of claim 1 wherein the overlapping first and second ends form a locking structure.

3. The device of claim 2 in which a compound motion must be imparted to at least one gripping section to remove the cotter.

4. The device of claim 1 in which said first end extends a predetermined distance beyond said overlapping ends to facilitate installation of said cotter.

5. The device of claim 1 wherein the wire stock is spring wire.

6. The device of claim 1 wherein the wire stock is stainless steel.

7. A coplanar bow tie locking cotter for a pin comprising:
    a continuous segment of wire stock having a first end and a locking end;
    said continuous segment of wire stock having a pair of similarly configured, oppositely disposed arcuate loops, said loops including at least one gripping portion;
    a helical section of said wire stock formed between said pair of arcuate loops;
    a first section adjoining said first end and one of said arcuate loops;
    wherein said locking end extends in a direction of said one of said arcuate loops and is located between said first end and said helical section adjacent said first section; and
    said locking end adopted to abut said pin in a locked condition when said cotter is received by said pin.

8. The device of claim 7 wherein the first end and the locking end overlap to form a locking structure.

9. The device of claim 8 in which a compound motion must be imparted to at least one gripping portion to remove the cotter.

10. The device of claim 7 in which said first end extends a predetermined distance beyond said locking end to facilitate installation of said cotter.

11. A coplanar bow lock hairpin cotter formed from a single piece of wire stock having first and second substantially similarly configured, oppositely disposed, gripping portions and a free end for attachment through an opening formed in a pin, said cotter comprising:
    a first section for being received in said opening, said first section being bent in a gradual reversed arc and adjoining a first end of a first arcuate loop, said first arcuate loop forming the first gripping portion;
    a second end of the first arcuate loop transgressing adjacent the first section and terminating in a second arcuate loop;
    said second arcuate loop forming the second gripping portion and terminating at a wire end wherein said wire end extends in a direction of said first arcuate loop and is located between said first end and said second end of said first arcuate loop and adjacent said first section; and
    said wire end adapted to substantially abut said pin in a locked condition when said cotter is received with said pin opening.

12. The device of claim 11 in which said first section extends a predetermined distance beyond said wire end to facilitate installation of said cotter.

13. A coplanar bow tie locking cotter for a pin having an opening, the coplanar bow tie locking cotter comprising:
    a single piece of formed wire having a first end, a first arcuate bend, a helical section, a second arcuate bend, and a locking end;
    the first end disposed for being received in the pin opening;
    the helical section being formed between the first and second arcuate bends for partially encapsulating the pin
    a first section adjoins said first end and said first arcuate bend;
    the first and second arcuate bends being substantially similarly configured; and
    the locking end being positioned adjacent said first section between the first end extending in a direction of said first arcuate bend and and the helical section for positively locking the cotter on the pin.

14. The device of claim 13 in which the first end extends a predetermined distance beyond the locking end to facilitate installation of the cotter.

15. The device of claim 13 in which a compound motion must be imparted to at least one arcuate bend to remove the cotter.

* * * * *